United States Patent [19]

Teramoto et al.

[11] Patent Number: 4,833,214
[45] Date of Patent: May 23, 1989

[54] SOLUBLE HEAT-RESISTANT AROMATIC POLYAMIDE TERMINATED WITH AROMATIC AMIDO MOIETIES

[75] Inventors: Takero Teramoto; Kazuaki Harada; Hiroharu Inoue, all of Kawasaki, Japan

[73] Assignees: Nippon Steel Corporation; Nippon Steel Chemical Co., Ltd., both of Tokyo, Japan

[21] Appl. No.: 945,552

[22] Filed: Dec. 23, 1986

[30] Foreign Application Priority Data

Dec. 27, 1985 [JP] Japan .................. 60-292983
Jun. 13, 1986 [JP] Japan .................. 61-135884

[51] Int. Cl.$^4$ ............................................. C08G 69/48
[52] U.S. Cl. ................... 525/420; 528/336; 528/344; 528/348
[58] Field of Search ........... 528/344, 348, 336; 525/420

[56] References Cited

U.S. PATENT DOCUMENTS 2,252,555 8/1941 Carothers .................. 260/78

FOREIGN PATENT DOCUMENTS 140623 3/1980 German Democratic Rep. .

OTHER PUBLICATIONS

Sidorova et al., Chemical Abstracts, vol. 85, No. 17 (1976), p. 30, Abstract No. 124,795.
Korshak et al., J. Macromol. Sci.-Rev. Macromol. Chem., C11 (1) pp. 45-142 (1974).

Primary Examiner—Harold D. Anderson
Attorney, Agent, or Firm—Wenderoth, Lind & Ponack

[57] ABSTRACT

A soluble heat-resistant aromatic polyamide having amide bonds at the terminal ends thereof represented by the formula (I):

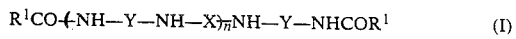

wherein $R^1$ represents an alkyl group or aromatic group,
Y represents

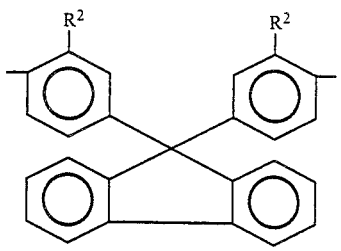

wherein $R^2$ represents hydrogen, methyl, or ethyl,
X represents

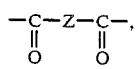

wherein Z represents an aromatic ring which may be substituted with an alkyl group, and
n is a recurring unit number; said polyamide having an inherent viscosity ($\eta_{inh}$) of at least 0.30 dl/g as measured in a solution of 0.5 g of the polyamide in 100 ml of dimethylacetamide at 30° C.

9 Claims, No Drawings

SOLUBLE HEAT-RESISTANT AROMATIC POLYAMIDE TERMINATED WITH AROMATIC AMIDO MOIETIES

BACKGROUND OF THE INVENTION

1. Field of the Invention

The present invention relates to a novel aromatic polyamide having an improved heat resistance, solubility, and processability and, more specifically, it relates to a novel soluble heat-resistant aromatic polyamide in which discoloration by oxidation is prevented by a terminal end treatment of a soluble heat-resistant polyamide.

2. Description of the Related Art

Aromatic polyamides, which have molecular structures having rigid aromatic rings and amide groups with strong intermolecular cohesive forces linked together, have higher softening points and heat decomposition points. Also, they have excellent heat resistance and chemical and physical properties, such as chemical resistance, mechanical characteristics, and electrical characteristics. Therefore, aromatic polyamides are very useful materials, particularly for fibers, films, paints, adhesives, and molded articles, for which heat-resistance is needed.

Usually, aramides such as Kevlar have the characteristics described above, but have a processability drawback in that they are not soluble in most solvents. Accordingly, a method is needed for overcoming this processability problem, by making the aramide soluble.

Korshack et al report on soluble polyamides in Journal of Macromolecular Science (J. Macromol. Sci., Rev. Macromol Chem., C11, 45, 1974), but do not mention the prevention of oxidation and the prevention of discoloration caused thereby.

Generally, aromatic polyamides have a high rigidity and a high symmetrical structure, and also have excellent mechanical characteristics and higher melting points, which are approximate to decomposition points, and therefore, they can be melt-molded only with difficulty. Further, they have a poor solubility, and thus have a drawback in that they cannot be easily applied as industrial materials.

Poly(p-phenyleneterephthalamide), which is a typical aromatic polyamide, can be dissolved in concentrated sulfuric acid or hexamethylphosphorylamide or N-methyl pyrrolidone having lithium chloride, calcium chloride, etc., dissolved therein. However, this polyamide has a very poor solubility and, therefore, is disadvantageous in that it can be used only with difficulty.

Also, the amino group directly bonded to an aromatic ring is very susceptible to oxidation. For example, it is well known that aniline, which is colorless and transparent when distilled, is rapidly oxidized and thus discolored. In the present invention, the 9,9-bis(4-aminophenyl)fluorene to be used as the starting material has two aniline groups, that is, amino groups directly bonded to the aromatic ring. For this reason, discoloration occurs during the polymerization reaction, and discoloration will also occur after polymer formation due to oxidation of the terminal amino groups by light, heat or air. Thus, the discoloration of polyamides not subjected to terminal end treatment will be gradually increased.

SUMMARY OF THE INVENTION

Accordingly, the objects of the present invention are to eliminate the above-mentioned disadvantages of the prior art and to provide a heat-resistant polyamide having an improved solubility and decreased discoloration.

Other objects and advantages of the present invention will be apparent from the following description.

In accordance with the present invention, there is provided a soluble heat-resistant aromatic polyamide having amide bonds at the terminal ends thereof represented by the formula (I):

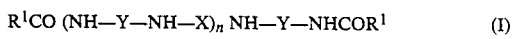

wherein $R^1$ represents an alkyl group (e.g., methyl, ethyl, propyl, butyl) or aromatic group (e.g., phenyl, an alkylphenyl, an oxycarbonyl phenyl, an alkoxycarbonyl phenyl such as methoxycarbonyl phenyl or ethoxycarbonyl phenyl, or a phenoxycarbonyl phenyl Y represents

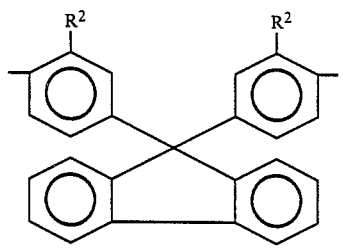

wherein $R^2$ represents hydrogen, methyl, or ethyl, X represent

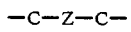

wherein Z represents an aromatic ring (e.g., benzene, naphthalene, biphenyl) which may be substituted with an alkyl group, and n is a recurring unit number; said polyamide having an inherent viscosity ($\eta_{inh}$) of at least 0.30 dl/g as measured in a solution of 0.5 g of the polyamide in 100 ml of dimethylacetamide at 30° C.

DESCRIPTION OF THE PREFERRED EMBODIMENT

The preferable soluble heat-resistant polyamides according to the present invention are those having an inherent viscosity ($\eta_{inh}$) of at least 0.30 dl/g as measured in a solution of 0.5 g of the above polyamide in 100 ml of dimethylacetamide at 30° C. and exhibiting a glass transition temperature of 280° C. to 420° C. and a decomposition temperature in air of 420° C. or higher.

The above-mentioned aromatic polyamide may be preferably a polyamide containing the constituent unit (a) and at least one of the constituent units (b) and (c) in the chain, which may be derived from the polymerization of approximately equal mole amounts of the component (a) and the components (b) and/or (c), as clear from the above-mentioned general formula (I). However, it should be noted that the component (a) is generally used in a somewhat excess mole amount when compared to the components (b) and/or (c) so that the terminal ends of the polyamide before the terminal treatment are the moieties derived from the component (a):

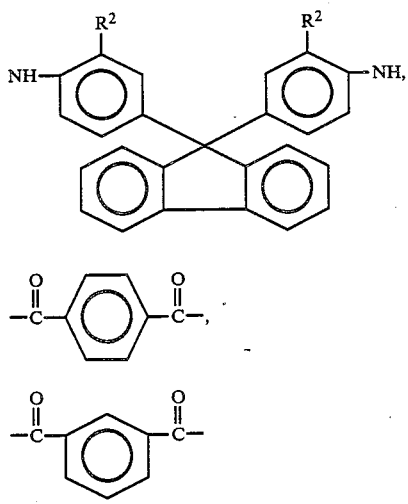

The polyamide of the present invention can be produced by, for example, using 9,9-bis(4-aminophenyl)-fluorene, 9,9-bis(3-methyl-4-aminophenyl)fluorene or 9,9-bis(3-ethyl-4-aminophenyl)fluorene as diamine component, and phthalic acids or their derivatives (e.g., terephthaloyl chloride, isophthaloyl chloride) or other aromatic dicarboxylic acids (e.g., naphthalene dicarboxylic acids and diphenyl dicarboxylic acids or their derivatives as a dicarboxylic acid component and carrying out polymerization under cooling in a solvent such as dimethylacetamide and the like.

During the polymerization using 9,9-bis(4-aminophenyl)fluorene with a high monomer purity and the addition of the acid chloride as a solid powder, discoloration during polymerization reaction can be inhibited.

According to the present invention, the polyamides obtained above are then subjected to a treatment of the terminal amino groups. The treatment of the terminal amino groups in the polyamide can be effected by using an alkyl halide (e.g., alkyl chloride), an acyl halide (e.g., acyl chloride), or an acyl anhydride to introduce an alkyl group or an aromatic group or a derivative group thereof as the polyamide terminal end $R^1$. For example, preferably an acetyl group, a benzoyl group, and the like, is introduced to make the $R^1$ in the above formula methyl, ethyl, phenyl, etc.

Furthermore, according to the present invention, a polyamide, which is free from discoloration and in which discoloration of a polymer is generated only with difficulty, can be obtained by controlling the terminal groups by using at least one the dicarboxylic acid component (b) and/or (c) as mentioned above. Such dicarboxlic acid components include, for example, phthaloyl halides (e.g., chlorides), phthalic acids. This causes the terminal ends of the polyamide to become amido groups instead of aniline groups susceptible to oxidation, whereby the polymer itself becomes resistant to oxidation by light, air, etc., and is discolored only with difficulty. According to the present invention, the halogen atom of the terminal ends obtained by the reaction of the polyamide with the component (b) or (c) can be further converted to a hydroxyl group, an alkoxy group (e.g., methoxy, ethoxy, propoxy), or a phenoxy group. This can be carried out by the reaction of the polyamide with water, an alcohol (e.g., methanol, ethanol, propanol), or a phenol.

Generally speaking, in preparing a polyamide by using the preparation method described above, discoloration will occur during polymerization. In the present invention, by enhancing the monomer purity to be used in the polymerization, discoloration of the polyamide obtained is substantially eliminated.

More specifically, by using the 9,9-bis(4-aminophenyl)fluorene having a melting point of 228° C. or higher as the lower limit temperature, preferably 231° C. or higher, most preferably 233° C. or higher, a polyamide can be obtained with substantially no discoloration.

Because of the terminal end treatment of the polyamide, the polymer solution can be stored for a long term without discoloration to a yellowish brown, and the film, fiber, etc., prepared from this polymer remains white and transparent with substantially no discoloration with the lapse of time. Further, discoloration by air oxidation is not increased.

The polyamide of the present invention has the physical properties of a glass transition temperature ranging from 280° C. to 420° C., preferably 300° to 400° C., a decomposition temperature in air of 420° C. or higher, preferably 450° C. or higher, with an inherent viscosity ($\eta_{inh}$) of 0.30 dl/g or more, preferably 0.35 dl/g or more, and especially preferably 0.35 to 3.0 dl/g.

The inherent viscosity was determined by measurement of a solution of 0.5 g of the polyamide of the present invention dissolved in 100 ml of dimethylacetamide at 30° C.

The polyamide of the present invention is soluble in pyridine, m-cresol, o-chlorophenol, N-methyl pyrrolidone (NMP), dimethylacetamide (DMAC), etc., but insoluble in chloroform, methylene chloride, toluene, and benzene.

By varying the proportions of the above components (b) and (c), the heat resistance and solubility can be controlled.

From the viewpoint of heat resistance and solubility, it is preferable to set the mole ratio of (b)/(c) components at 90/10 to 10/90, more preferably 70/30 to 20/80. Also, at an approximately equimolar ratio, the film hardness is softened and thus is readily available as an industrial material. As can be also understood from the Examples described later, a better solubility can be obtained because the proportion of isophthalic acid is greater in relation to the terephthalic acid. By increasing the proportion of terephthalic acid, the solubility of the resultant polymer in N-methyl pyrrolidone and dimethylacetamide is reduced. On the other hand, the glass transition temperature tends to be higher as the proportion of terephthalic acid is increased.

According to the present invention, there can be provided a polyamide having good mechanical characteristics and electrical insulating characteristics, and the polyamide obtained is suitable for use in the field of electrical insulation, etc.

Further, the polyamide of the present invention can be made into a thin film, without discoloration, with a thickness of about 0.005 to 0.20 mm, and can be used for various purposes.

EXAMPLES

The present invention will now be further illustrated by, but is by no means limited to, the following Examples, wherein all parts and percentages are expressed on a weight basis unless otherwise noted.

EXAMPLE 1

In a one liter three-necked flask equipped with a stirrer, 34.8 g 9,9-bis(4-aminophenyl)fluorene (mp 233°–235° C.) and 20.2 g of triethylamine were dissolved in 500 g of dimethylacetamide.

At a bath temperature maintained at 5° to 10° C., a mixture of 10.15 g of terephthaloyl chloride and 10.15 g of isophthaloyl chloride was gradually added as the solid.

After three hours, 1.1 g of benzoyl chloride was added and further stirred for 2 hours, followed by removal by filtration of the triethylamine hydrochloride to obtain a polyamide solution. When benzoyl chloride was not added, discoloration began to occur several hours after the reaction, but substantially no discoloration occurred in the case of the present method and the solution could be stored for a long time. The polyamide obtained had the physical properties of an inherent viscosity of 0.41 dl/g, a glass transition temperature of 320° C., and a decomposition temperature in air of 470° C.

The above polyamide solution was cast on a glass plate and dried under a reduced pressure to obtain a polyamide film. The film was found to have a tensile strength of 9.0 kgf/mm$^2$ and a tensile modulus of 570 kgf/mm$^2$.

The polymer could be dissolved in N-methyl pyrrolidone, dimethylacetamide, pyridine, o-chlorophenol, and m-cresol.

The inherent viscosity ($\eta_{inh}$) was measured by dissolving 0.5 g of the polyamide in 100 ml of dimethylacetamide and using an Ostwald viscometer in a thermostat water bath of 30° C.

EXAMPLE 2

Using the same device as in Example 1, 6.96 g of 9,9-bis(4-aminophenyl)fluorene (mp 232°–234° C.) was dissolved in 200 ml of dimethylacetamide and further 4.04 g of triethylamine was added. While the mixture was maintained at 5° C., 4.06 g of isophthaloyl chloride was gradually added thereto. After stirring for 3 hours, 1 g of benzoyl chloride was added and stirring was further continued for 2 hours. The resultant polymer solution was poured into water, filtered, and then washed with water and methanol, followed by drying, to give a white powdery polymer.

The above white powdery polymer was dissolved in dimethylacetamide and cast on a glass plate to prepare a film. The film obtained was found to have a tensile strength of 8.5 kgf/mm$^2$ and a tensile modulus of 560 kgf/mm$^2$.

The same experiment was conducted by changing the isophthalic chloride in this Example to terephthalic chloride. The results are summarized, together with the results of Example 3, in Table 1.

EXAMPLE 3

As in Example 2, 6.96 g of 9,9-bis(4-aminophenyl)-fluorene (mp 232°–234° C.) was dissolved in 200 ml of dimethylacetamide and, further, 4.04 g of triethylamine was added. This mixture was maintained at 5° C., and a mixture of 2.03 g of terephthaloyl chloride and 2.03 g of isophthaloyl chloride was added thereto. Then, after stirring for 3 hours, 1 g of benzoyl chloride was added, followed by further stirring for 2 hours. After the polymer solution was filtered, the polymer was poured into methanol and filtered, followed by washing with methanol and drying.

The resultant polymer was dissolved in dimethylacetamide and cast on a glass plate to prepare a film.

No discoloration of the film was observed and, further, no discoloration was observed even after the film was left to stand in air for one month.

The film was found to have a tensile strength of 11.9 kgf/mm$^2$ and a tensile modulus of 590 kgf/mm$^2$, a volume resistivity of $5.4 \times 10^{15}$ Ω.cm at 23° C. and $3.7 \times 10^7$ Ω.cm at 200° C., a dielectric constant of 4.02, a dielectric dissipation factor of 0.054 at 1 MHz, a dielectric breakdown strength of 88 kV/mm, a total light transmittance of 90.3%, and a yellowing factor of 4.1%.

TABLE 1

| Terephthalic acid/isophthalic acid molar ratio | 10/0 | 5/5 | 0/10 |
|---|---|---|---|
| Solubility: | | | |
| Pyridine | ⊚ | ⊚ | ⊚ |
| m-Cresol | ⊚ | ⊚ | ⊚ |
| o-Chlorophenol | ⊚ | ⊚ | ⊚ |
| N—methyl pyrrolidone | ○ | ⊚ | ⊚ |
| Dimethylacetamide | ○ | ⊚ | ⊚ |
| Chloroform | x | x | x |
| Benzene | x | x | x |
| THF | x | x | x |
| $\eta_{inh}$ (dl/g) | 0.66 | 0.41 | 0.47 |
| Tg (°C.) | 380 | 320 | 330 |
| Decomposition temperature (°C.) | 455 | 470 | 480 |

⊚ readily soluble (easily dissolved in solvent)
○ soluble (slowly dissolved)
x insoluble A commercially available product Kevlar (registered trade mark) was insoluble in any of the above solvents.

EXAMPLE 4

In a one liter three-necked flask equipped with a stirrer, 34.8 g of 9,9-bis(4-aminophenyl)fluorene (mp 234°–235° C.) and 20.2 g of triethylamine were dissolved in 500 g of dimethylacetamide.

While maintained at a temperature in the flask of 5° C. to 10° C., and stirring the solution in the flask, a mixture of 10.15 g of terephthaloyl chloride and 10.15 g of isophthaloyl chloride was gradually added as the solid.

After stirring for 4.5 hours, 5 mg of terephthalic acid chloride was added, followed by stirring for 30 minutes, and the precipitated triethylamine hydrochloride was filtered by a glass filter to obtain a polymer solution. This solution was cast on a glass plate and dried at 100° C. under a reduced pressure for 5 hours to obtain a polyamide film.

The polyamide film obtained had an inherent viscosity ($\eta_{inh}$) of 0.41 dl/g, a glass transition temperature of 320° C., and a decomposition temperature in air of 465° C.

Also, the film was found to have a tensile strength of 10.1 kgf/mm$^2$, a tensile modulus of 590 kgf/mm$^2$, a volume resistivity of $3 \times 10^{16}$ Ω.cm at 23° C. and $4.8 \times 10^7$ Ω.cm at 200° C., a dielectric constant of 4.36 at 1 μHz, a water absorption degree of 7.6%, a total light transmittance of 90.3%, and a yellowing factor of 4.6%.

The IR-absorption spectra of this polyamide exhibited absorptions of NH at 3300 cm$^{-1}$, amide C=O at 1680 cm$^{-1}$ and aromatics at 3100–2900 cm$^{-1}$ and 1610, 1520 cm$^{-1}$.

EXAMPLE 5

As in Example 4, 3.48 g of 9,9-bis(4-aminophenyl)-fluorene (mp 231°-234.5° C.) and 2.02 g of triethylamine were dissolved in 50 g of dimethylacetamide and 2.03 g of a mixture of terephthalic chloride and isophthalic chloride added as a powder to the solution.

The mixing ratio of terephthalic chloride and isophthalic chloride was varied as shown in Table 2. Several hours after initiation of the reaction, the solution became a viscous solution. After stirring for 4.5 hours, 5 mg of a mixture of terephthaloyl acid chloride and isophthaloyl chloride was added, followed by stirring for 30 minutes. The solution was poured into methanol, and the polymer was washed with water and methanol. Then, the polymer was dried at 100° C. for 8 hours to obtain a powdered polyamide. This powder could be easily dissolved in dimethylacetamide, etc. The solubility, the glass transition temperature, and the decomposition of the polyamide obtained are shown in Table 2.

The solubility column shows the solubility at a concentration of 15 wt. % in various solvents; ⊚ indicating readily soluble, o soluble, and x insoluble.

The inherent viscosity ($\eta_{inh}$) was measured by dissolving 0.5 g of the polyamide in 100 ml of dimethylacetamide and using an Ostwald viscometer in a thermostat water bath of 30° C.

TABLE 2

| Terephthalic/ isophthalic ratio (molar ratio) | Pyridine | m-Cresol | o-Chlorophenol | N-methyl pyrrolidone | Dimethylacetamide | Chloroform | Methylene chloride | Toluene | Benzene | Inherent viscosity $\eta_{inh}$ [dl/g] | Tg [°C.] | Decomposition temperature [°C.] |
|---|---|---|---|---|---|---|---|---|---|---|---|---|
| 100/0 | ⊚ | ⊚ | ⊚ | o | o | x | x | x | x | 0.66 | 380 | 475 |
| 90/10 | ⊚ | ⊚ | ⊚ | ⊚ | o | x | x | x | x | 0.77 | 375 | 470 |
| 70/30 | ⊚ | ⊚ | ⊚ | ⊚ | ⊚ | x | x | x | x | 0.57 | 360 | 465 |
| 50/50 | ⊚ | ⊚ | ⊚ | ⊚ | ⊚ | x | x | x | x | 0.41 | 320 | 465 |
| 40/60 | ⊚ | ⊚ | ⊚ | ⊚ | ⊚ | x | x | x | x | 0.39 | 310 | 450 |
| 30/70 | ⊚ | ⊚ | ⊚ | ⊚ | ⊚ | x | x | x | x | 0.42 | 315 | 450 |
| 20/80 | ⊚ | ⊚ | ⊚ | ⊚ | ⊚ | x | x | x | x | 0.43 | 320 | 465 |
| 10/90 | ⊚ | ⊚ | ⊚ | ⊚ | o | x | x | x | x | 0.44 | 320 | 465 |
| 0/100 | ⊚ | ⊚ | ⊚ | o | o | x | x | x | x | 0.47 | 330 | 480 |

There will be an increasing demand for heat-resistant polymers in the space, aircraft, electrical, steel, and other industries. In these fields, heat-resistant polymers are used in a form such as paint, adhesive, film, molded products, etc., and a high heat-resistance and appropriate solubility are demanded.

The aromatic polyamide according to the present invention, as can be seen from the above examples, has a decomposition temperature of 450° C. or higher with a glass transition temperature (Tg) which can be varied as desired, whereby a desired processability in conformity with demand can be easily obtained. Furthermore, according to the present invention, although a broad scope of solubilities can be obtained, a chemical resistance is exhibited to general purpose solvents such as benzene, toluene, methylene chloride, chloroform, etc., and therefore, the polyamide of the invention is broadly applicable and useful as an industrial material.

Particularly, it can be used for electrical and electronic parts such as resistance plates, front plates for printed boards, and mechanical parts such as pulleys, electronic ranges, etc., and also turbofans.

Further, metallic materials applied with a coating of the solution paint of the polyamide of the present invention become chemically resistant to benzene, toluene, methylene chloride, chloroform, etc., thus exhibiting an increased durability.

We claim:

1. A soluble heat-resistant aromatic polyamide having amide groups at the terminal ends thereof represented by the formula (I):

$$R^1CO(-NH-Y-NH-X)_{\overline{n}}NH-Y-NHCOR^1 \quad (I)$$

wherein $R^1$ represents an aromatic group,
Y represents

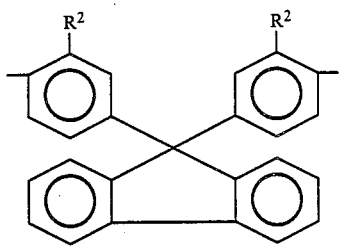

wherein $R^2$ represents hydrogen, methyl or ethyl,
X represents

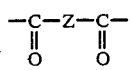

wherein Z represents an unsubstituted aromatic ring or an aromatic ring substituted with an alkyl group, and n is a recurring unit number; said polyamide having an inherent viscosity ($\eta_{inh}$) of at least 0.30 dl/g as measured in a solution of 0.5 g of the polyamide in 100 ml of dimethylacetamide at 30° C.

2. A soluble heat-resistant polyamide as claimed in claim 1, wherein the inherent viscosity is 0.35 dl/g or more.

3. A soluble heat-resistant polyamide as claimed in claim 1, which is soluble in at least one solvent selected from the group consisting of pyridine, m-cresol, or o-chlorophenol.

4. A soluble heat-resistant polyamide as claimed in claim 1, wherein $R^1$ in the formula (I) is phenyl, oxycarbonyl phenyl, methoxycarbonyl phenyl, or ethoxycarbonyl phenyl.

5. A soluble heat-resistant polyamide as claimed in claim 1, wherein Y in the formula (I) is the following group:

6. A soluble heat-resistant polyamide as claimed in claim 1, wherein X in the formula (I) is at least one member selected from the group consisting of:

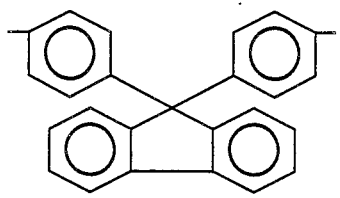

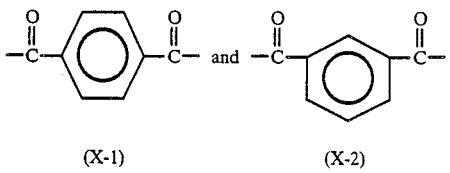

7. A soluble heat-resistant polyamide as claimed in claim 1, wherein the polyamide has a glass transition temperature of 280° C. to 420° C. and a decomposition temperature in air of 420° C. or higher.

8. A soluble heat-resistant polyamide as claimed in claim 1, wherein the inherent viscosity ($\eta_{inh}$) is 0.35 dl/g or more, the glass transition temperature is 300° to 400° C., and the decomposition temperature in air is 450° C. or higher.

9. A soluble heat-resistant polyamide as claimed in claim 6, wherein the mole ratio of X in the formula (I) is $X-1/X-2 = 90/10$ to $10/90$.

* * * * *